US009621843B2

(12) United States Patent
Cheng

(10) Patent No.: US 9,621,843 B2
(45) Date of Patent: Apr. 11, 2017

(54) NETWORK DEVICE AND METHOD FOR DYNAMIC ADJUSTMENT OF VIDEO RESOLUTION

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Ming-Chieh Cheng, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/135,567

(22) Filed: Apr. 22, 2016

(65) Prior Publication Data

US 2017/0064248 A1 Mar. 2, 2017

(30) Foreign Application Priority Data

Aug. 31, 2015 (TW) .............................. 104128703 A

(51) Int. Cl.
*H04N 7/01* (2006.01)
*H04N 9/80* (2006.01)
*H04B 17/318* (2015.01)
*H04W 24/10* (2009.01)

(52) U.S. Cl.
CPC ......... *H04N 7/0117* (2013.01); *H04B 17/318* (2015.01); *H04N 7/0125* (2013.01); *H04W 24/10* (2013.01)

(58) Field of Classification Search
CPC .. H04N 7/0117; H04N 7/0125; H04B 17/318; H04W 24/10

USPC ............ 348/441, 581, 724, 704, 561, 387.1, 348/390.1; 375/240.01, 240.02, 240.26; 725/81, 148, 116; 455/452.1, 452.2; 370/468

See application file for complete search history.

(56) References Cited

U.S. PATENT DOCUMENTS

| 2009/0185617 A1* | 7/2009 | Houghton | ............ | G05D 1/0038 |
| | | | | 375/240.01 |
| 2013/0263202 A1* | 10/2013 | Bull | ................. | H04N 21/23406 |
| | | | | 725/116 |
| 2015/0101003 A1* | 4/2015 | Bull | ................. | H04N 21/64761 |
| | | | | 725/116 |

FOREIGN PATENT DOCUMENTS

TW   200711387 A   3/2007
TW   201114283 A1  4/2011

* cited by examiner

*Primary Examiner* — Paulos M Natnael
*Assistant Examiner* — Jean W Desir
(74) *Attorney, Agent, or Firm* — Steven M. Reiss

(57) ABSTRACT

A method for dynamic adjustment of video resolution when watching TV, sets a first, second, and third threshold values for a Received Signal Strength Indication (RSSI), the first threshold value being greater than the second threshold value and the second threshold value being greater than the third threshold value. A working mode of a receiving WI-FI device is detected. An RSSI value of WI-FI signals being received by a user terminal is calculated and the RSSI value is compared with first, second, and third threshold values. Taking working mode of the WI-FI device into account, the video resolution of video streams to be transmitted are adjusted according to results of comparisons and the adjusted video streams are transmitted to the user terminal.

12 Claims, 4 Drawing Sheets

| MCS index | Spatial streams | Modulation type | Coding rate | Data rate (Mbit/s) | | | |
|---|---|---|---|---|---|---|---|
| | | | | 20 MHz channel | | 40 MHz channel | |
| | | | | 800 ns GI | 400 ns GI | 800 ns GI | 400 ns GI |
| 0 | 1 | BPSK | 1/2 | 6.50 | 7.20 | 13.50 | 15.00 |
| 1 | 1 | QPSK | 1/2 | 13.00 | 14.40 | 27.00 | 30.00 |
| 2 | 1 | QPSK | 3/4 | 19.50 | 21.70 | 40.50 | 45.00 |
| 3 | 1 | 16-QAM | 1/2 | 26.00 | 28.90 | 54.00 | 60.00 |
| 4 | 1 | 16-QAM | 3/4 | 39.00 | 43.30 | 81.00 | 90.00 |
| 5 | 1 | 64-QAM | 2/3 | 52.00 | 57.80 | 108.00 | 120.00 |
| 6 | 1 | 64-QAM | 3/4 | 58.50 | 65.00 | 121.50 | 135.00 |
| 7 | 1 | 64-QAM | 5/6 | 65.00 | 72.20 | 135.00 | 150.00 |

FIG. 2

NETWORK DEVICE AND METHOD FOR DYNAMIC ADJUSTMENT OF VIDEO RESOLUTION

CROSS-REFERENCE TO RELATED APPLICATIONS

This application claims priority to Taiwanese Patent Application No. 104128703 filed on Aug. 31, 2015, the contents of which are incorporated by reference herein.

FIELD

The present disclosure generally relates to video resolution adjustment.

BACKGROUND

Wireless throughput of a cable gateway or a media gateway is affected by the environment. Therefore, the Institute of Electrical and Electronics Engineers (IEEE) have to update communication standards to provide more stable data transmission standards. However, inter-channel interference or next channel interference is usually generated by, for example, a microwave oven or an induction cooker, such that wireless signals cannot be sustained and output in a stable manner, which reduces user enjoyment of video on TV.

BRIEF DESCRIPTION OF THE DRAWINGS

Implementations of the present technology will now be described, by way of example only, with reference to the attached figures.

FIG. 2 illustrates an embodiment of Modulation Coding Schemes (MCSs) and corresponding bit rates for the 802.11n standard;

DETAILED DESCRIPTION

Figure 1:
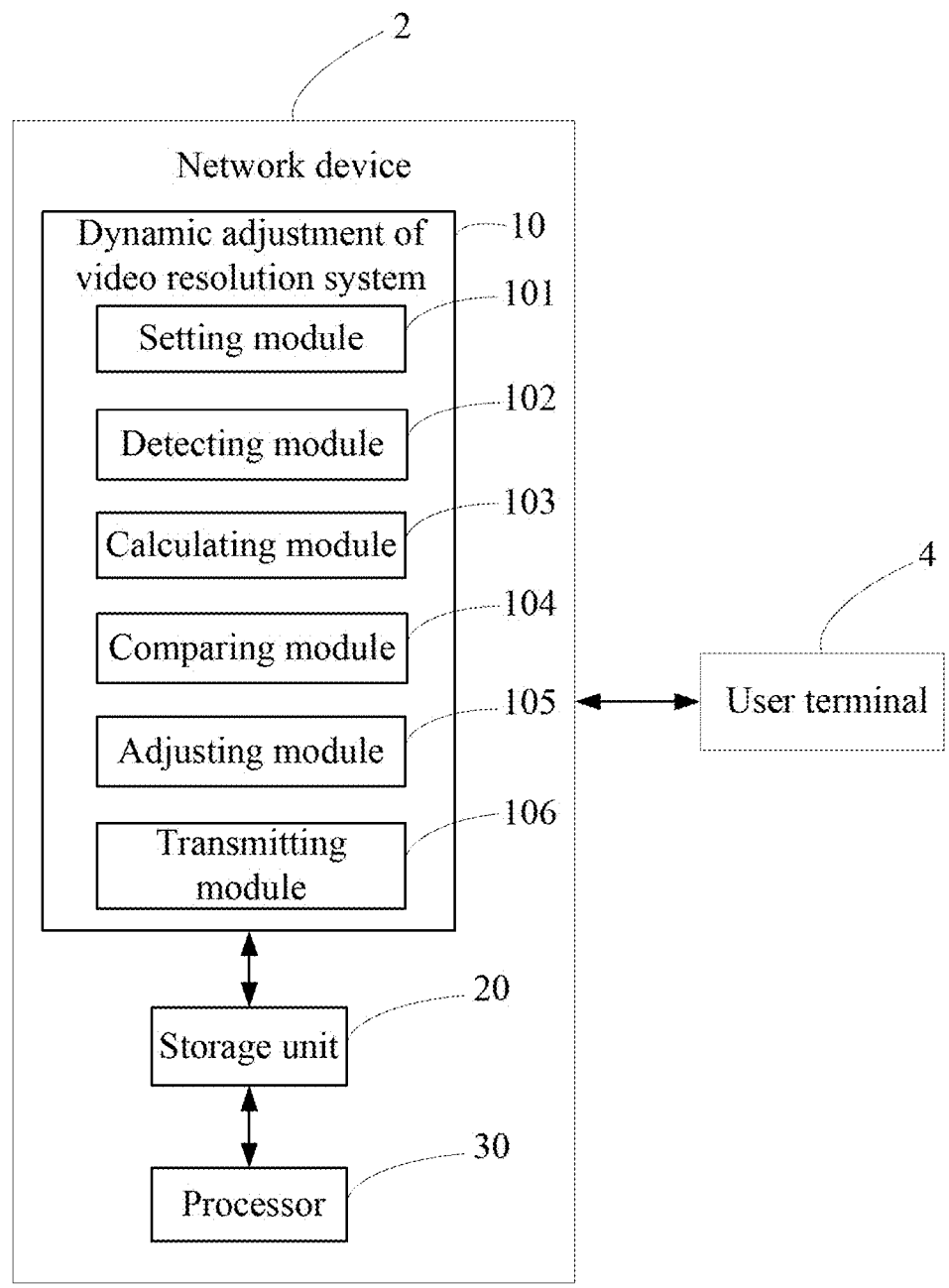
FIG. 1 illustrates an embodiment of functional modules of a network device comprising a dynamic adjustment of video resolution system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates an embodiment of function modules of a network device comprising a dynamic adjustment of video resolution system (network device 2). In the illustrated embodiment, the network device 2 includes a dynamic adjustment of video resolution system 10, a storage unit 20, and a processor 30. The network device 2 may be a gateway, modem, or other equipment, which connects to one or more user terminals 4 with wires or wirelessly. The dynamic adjustment of video resolution system 10 is used to adjust the video resolution for user terminal 4.

In one embodiment, the dynamic adjustment of video resolution system 10 includes a setting module 101, a detecting module 102, a calculating module 103, a comparing module 104, an adjusting module 105, and a transmitting module 106. One or more of the function modules include computerized code in the form of one or more programs that are stored in the storage unit 20 and executed by the processor 30 to provide functions of the dynamic adjustment of video resolution system 10. The storage unit 20 can be a dedicated memory, such as an EPROM, or a flash memory. Descriptions of the functions of the modules 101-106 are given with reference to FIG. 4.

Figure 4:
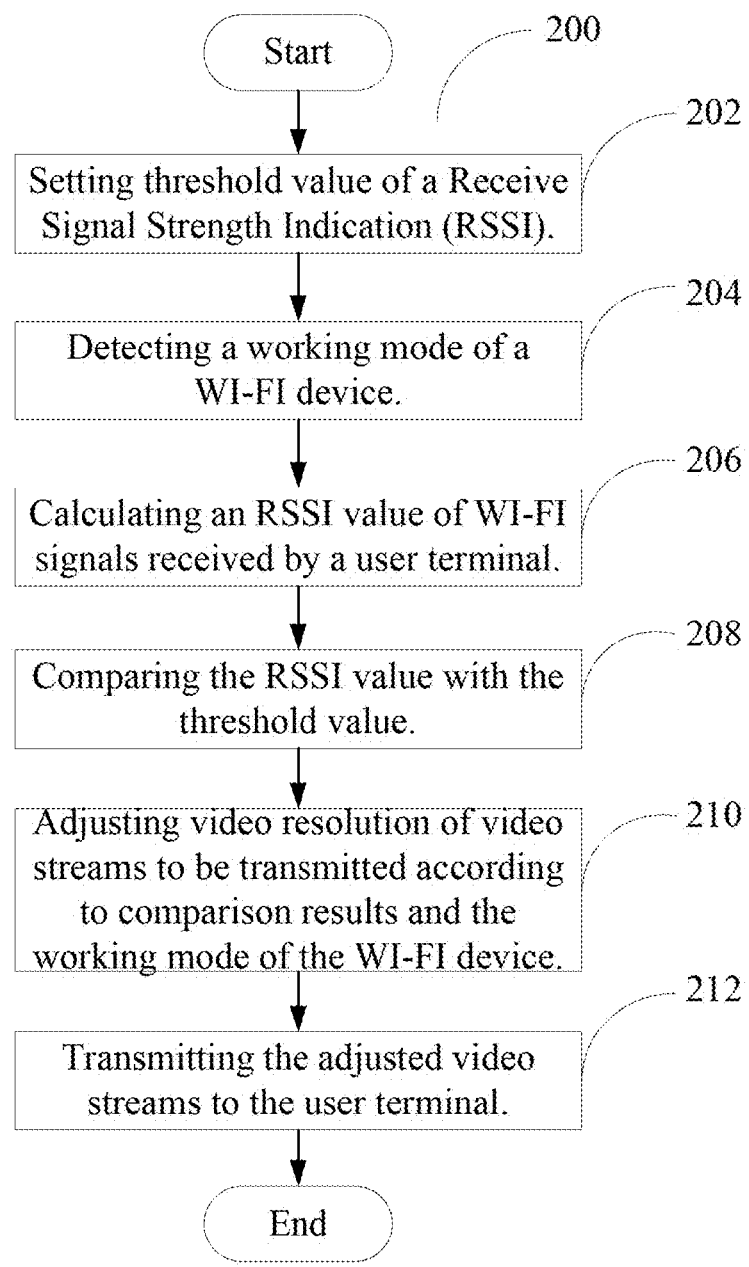
FIG. 4 illustrates a flowchart of an embodiment of a method for dynamic adjustment of video resolution.

FIG. 4 presents a flowchart in accordance with an embodiment of a method for dynamic adjustment of video resolution 200. The adjustment method 200 is provided by way of example, as there are a variety of ways to carry out the method. The method 200 described below can be carried out using the configurations illustrated in FIG. 1, for example, and various elements of these figures are referenced in explaining the adjustment method 200. Each block shown in FIG. 4 represents one or more processes, methods, or subroutines, carried out in the exemplary adjustment method 200. Additionally, the illustrated order of blocks is by example only and the order of the blocks can change. The adjustment method 200 can begin at block 202.

At block 202, the setting module 101 sets a first threshold value, a second threshold value, and a third threshold value for Received Signal Strength Indication (RSSI). The first threshold value is greater than the second threshold value and the second threshold value is greater than the third threshold value. In one embodiment, the first threshold value is −50 decibels relative to one milliwatt (dBm), the second threshold value is −70 dBm, while the third threshold value is −78 dBm.

At block 204, the detecting module 102 detects a working mode of a WI-FI device. In one embodiment, the WI-FI device provides multiple working modes, comprising 802.11ac, 802.11n, and 802.11g and their corresponding Modulation Coding Schemes (MCSs). An MCS index value of the current working mode of the WI-FI device and at least first, second, and third preset values for the MCS index value are defined. Referring to FIG. 2, an embodiment of the first preset value corresponds to MCS index value 5, the modulation type thereof is 64-Quadrature Amplitude Modulation (64-QAM). The second preset value corresponds to MCS index value 3, the modulation type thereof is 16-QAM. The third preset value corresponds to MCS index value 1, the modulation type thereof is Quadrature Phase Shift Keying (QPSK). Experiments show that the detected data transmission rate can only reach 70% of the theoretical value. Referring to FIG. 2, for example, when the MCS index value of the current working mode of the WI-FI device is 7, the theoretical maximum value of the data transmission rate under bandwidth 40 Megahertz (MHz) with 400 nanoseconds (ns) GI should be 150 million bits per second (Mbps). However, the real data transmission rate is 70% of 150 Mbps, which is equal to 105 Mbps, (150*0.7=105).

Figure 3:
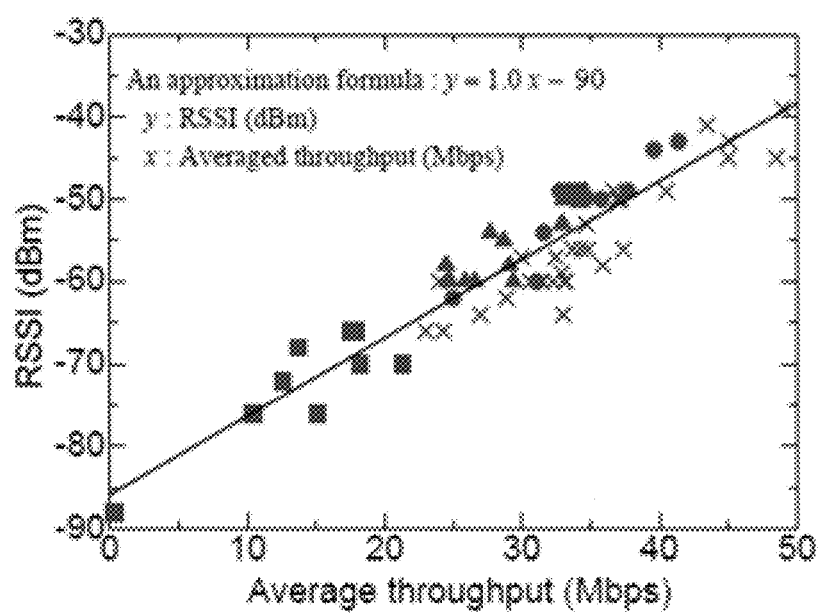
FIG. 3 illustrates an embodiment of a linear regression graph of Received Signal Strength Indication (RSSI) values and data transmission rates based on the 802.11n standard.

At block 206, the calculating module 103 calculates an RSSI value of WI-FI signals received by a user terminal. In one embodiment, RSSI=Txpower+AntennaGain−PathLoss. After experiments, a linear regression graph of relationships between the RSSI and the data transmission rates can be generated, as shown in FIG. 3.

At block 208, the comparing module 104 compares the RSSI value with the first threshold value, the second threshold value, and the third threshold value.

At block 210, the adjusting module 105 adjusts the video resolution of video streams being transmitted according to results of comparisons and the working mode of the WI-FI device. In one embodiment, the video resolution is changed to super-definition (very high definition) when the RSSI value is greater than the first threshold value and the MCS index value is greater than the first preset value. The video resolution is changed to the high-definition when the RSSI value is greater than the second threshold value and the MCS index value is greater than the second preset value. The video resolution is changed to the standard definition when the RSSI value is greater than the third threshold value and the MCS index value is greater than the third preset value.

The adjusting module 105 adjusts the video resolution according to the smaller one of the RSSI value and the MCS index value. For example, when the RSSI value is greater than the first threshold value and the MCS index value is less than or equal the first preset value, the video resolution of the video streams is adjusted according to the MCS index value.

At block 212, the transmitting module 106 transmits the adjusted video streams to the user terminal.

The transmitting module 106 replies a signal interrupt message to the user terminal when the RSSI value is less than or equal to the third threshold value.

The embodiments shown and described above are only examples. Many details are often found in the art such as the other features of a network device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for dynamic adjustment of video resolution, executable by a processor of a server, the method comprising:
   setting a first threshold value, a second threshold value and a third threshold value for Receive Signal Strength Indication (RSSI), wherein the first threshold value is greater than the second threshold value and the second threshold value is greater than the third threshold value;
   detecting a working mode of a WI-FI device;
   calculating an RSSI value of WI-FI signals received by a user terminal;
   comparing the RSSI value with the first threshold value, the second threshold value, and the third threshold value;
   adjusting video resolution of video streams being transmitted according to results of comparisons and the working mode of the WI-FI device; and
   transmitting the adjusted video streams to the user terminal.

2. The method as claimed in claim 1, wherein the WI-FI device provides multiple the working modes comprising 802.11ac, 802.11n and 802.11g with their corresponding Modulation Coding Schemes (MCSs).

3. The method as claimed in claim 2, further comprising:
   defining an MCS index value of the current working mode of the WI-FI device and at least first, second, and third preset value for the MCS index value.

4. The method as claimed in claim 3, wherein the adjusting step further comprises:
   adjusting the video resolution to the super-definition when the RSSI value is greater than the first threshold value and the MCS index value is greater than the first preset value;
   adjusting the video resolution to the high-definition when the RSSI value is greater than the second threshold value and the MCS index value is greater than the second preset value; and
   adjusting the video resolution to the standard-definition when the RSSI value is greater than the third threshold value and the MCS index value is greater than the third preset value.

5. The method as claimed in claim 2, further comprising:
   adjusting the video resolution according to the smaller one of the RSSI value and the MCS index value.

6. The method as claimed in claim 1, further comprising:
   replying a signal interrupt message to the user terminal when the RSSI value is less than or equal to the third threshold value.

7. A network device, which is connected to a user terminal in a wireless manner, the network device comprising:
   at least one processor;
   a storage system; and
   one or more programs that are stored in the storage system and executed by the at least one processor, the one or more programs comprising instructions for:
   setting a first threshold value, a second threshold value and a third threshold value for Receive Signal Strength Indication (RSSI), wherein the first threshold value is greater than the second threshold value and the second threshold value is greater than the third threshold value;
   detecting a working mode of a WI-FI device;
   calculating an RSSI value of WI-FI signals received by a user terminal;
   comparing the RSSI value with the first threshold value, the second threshold value, and the third threshold value;

adjusting video resolution of video streams being transmitted according to results of comparisons and the working mode of the WI-FI device; and transmitting the adjusted video streams to the user terminal.

8. The network device as claimed in claim 7, wherein the WI-FI device provides multiple the working modes comprising 802.11ac, 802.11n and 802.11g with their corresponding Modulation Coding Schemes (MCSs).

9. The network device as claimed in claim 8, further comprises instructions for:

defining an MCS index value of the current working mode of the WI-FI device and at least first, second, and third preset value for the MCS index value.

10. The network device as claimed in claim 9, further comprises instructions for:

adjusting the video resolution to the super-definition when the RSSI value is greater than the first threshold value and the MCS index value is greater than the first preset value;

adjusting the video resolution to the high-definition when the RSSI value is greater than the second threshold value and the MCS index value is greater than the second preset value; and adjusting the video resolution to the standard-definition when the RSSI value is greater than the third threshold value and the MCS index value is greater than the third preset value.

11. The network device as claimed in claim 8, further comprises instructions for:

adjusting the video resolution according to the smaller one of the RSSI value and the MCS index value.

12. The network device as claimed in claim 7, further comprises instructions for:

replying a signal interrupt message to the user terminal when the RSSI value is less than or equal to the third threshold value.

* * * * *